(12) United States Patent
DePue et al.

(10) Patent No.: US 7,738,733 B2
(45) Date of Patent: Jun. 15, 2010

(54) SYSTEMS AND METHODS FOR 3-D IMAGING

(75) Inventors: Marshall T. DePue, San Jose, CA (US); Tong Xie, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 603 days.

(21) Appl. No.: 11/238,472

(22) Filed: Sep. 29, 2005

(65) Prior Publication Data

US 2007/0076089 A1     Apr. 5, 2007

(51) Int. Cl.
*H04N 13/00*     (2006.01)
*H04N 15/00*     (2006.01)

(52) U.S. Cl. .......................................... 382/285; 348/42
(58) Field of Classification Search .................. 348/42; 382/285, 106, 312
See application file for complete search history.

(56) References Cited

U.S. PATENT DOCUMENTS

| | | | | |
|---|---|---|---|---|
| 3,705,261 A | * | 12/1972 | Langley | 348/42 |
| 5,528,232 A | * | 6/1996 | Verma et al. | 340/825.49 |
| 5,764,786 A | * | 6/1998 | Kuwashima et al. | 382/107 |
| 6,324,296 B1 | * | 11/2001 | McSheery et al. | 382/107 |
| 6,370,262 B1 | * | 4/2002 | Kawabata | 382/106 |
| 6,553,130 B1 | * | 4/2003 | Lemelson et al. | 382/104 |
| 7,155,308 B2 | * | 12/2006 | Jones | 700/245 |
| 2004/0020000 A1 | * | 2/2004 | Jones | 15/319 |
| 2004/0164972 A1 | * | 8/2004 | Carl | 345/179 |
| 2007/0211239 A1 | * | 9/2007 | Mandella et al. | 356/138 |
| 2008/0015017 A1 | * | 1/2008 | Ashida et al. | 463/37 |

OTHER PUBLICATIONS

"Silicon Optical Navigation" Gary Gordon, et al., dated Apr. 17, 2003.

* cited by examiner

*Primary Examiner*—Bhavesh M Mehta
*Assistant Examiner*—Stephen R Koziol

(57) ABSTRACT

The various embodiments generally describe systems and methods related to 3-dimensional (3-D) imaging. In one exemplary embodiment, an imaging system incorporates a 2-dimensional (2-D) image capture system that generates 2-D digital image information representing an object, a signal transmitter that transmits a ranging signal towards the object, and a signal receiver that receives the ranging signal returned by the object. Also included, is an image processor that computes distance information from the time difference between signal transmission and reception of the ranging signal. The image processor combines the distance information and 2-D digital image information to produce 3-D digital image information representing the object.

20 Claims, 9 Drawing Sheets

SYSTEMS AND METHODS FOR 3-D IMAGING

DESCRIPTION OF THE RELATED ART

Image capture systems can be broadly classified as analog systems and digital systems. Both systems typically employ an optical image capture process that uses a lens system to capture light from an object to be imaged. One example of an analog image capture system is an analog camera which focuses light originating from an object on to a photographic film. The photographic film stores two-dimensional (2-D) image information in the form of analog luminance and chrominance values.

A second example of an analog image capture system is a stereoscopic camera that simultaneously captures two images of the object from two different angles. The captured image can be used to generate a three-dimensional (3-D) image which permits a viewer a certain degree of depth perception. A third example of an analog image capture system uses holographic techniques to generate a 3-D image of the object. The generated 3-D image provides further advantages in terms of improved depth perception from several viewing angles, but such an image capture system tends to be expensive because it employs a laser for generating the holographic image.

In general, irrespective of being a 2-D or a 3-D system, analog image capture systems do not permit a high degree of flexibility in processing the captured analog image. For example, the captured analog image cannot be easily edited to rectify image defects or to modify image content.

However, some of these handicaps may be overcome by using a digital imaging system because such a digital imaging system generates image information in the form of digital data that can be readily manipulated for image processing purposes. An example of a digital image capture system is a digital camera which uses a lens to focus light originating from an object on to an optoelectronic sensor array. The electrical signals derived from the sensor array are used to produce pixel-level 2-D digital information representing the object. The digital information can be processed by an image processor for viewing on a computer screen of for printing a 2-D image on a photo-printer.

A second example of a digital image capture system is a scanner which illuminates the object and captures light returned from the object to generate 2-D digital image information representing the object. Certain hand-held scanners may further be employed to capture a 3-D digital image of the object. The 3-D digital image provides a greater amount of information than a corresponding 2-D image of the object.

Typically, 3-D digital image capture systems incorporate a laser source and an optics system containing one or more lenses. In some systems, the laser source and the optics system are discrete components of a multi-element system; while in some other systems the laser source and the optics system are integrated into a single unit such as the hand-held scanner. In either case, the cost of the laser source and the associated optics tends to be high, thereby proving to be a handicap in using 3-D digital image capture systems for applications that are cost-sensitive.

Based on the above-mentioned handicaps of image capture systems, an unaddressed need exists in the industry to overcome such deficiencies and inadequacies.

SUMMARY

Systems and methods are provided for 3-D imaging. In one exemplary embodiment, an imaging system incorporates a 2-dimensional (2-D) image capture system that generates 2-D digital image information representing an object, a signal transmitter that transmits a ranging signal towards the object, and a signal receiver that receives the ranging signal returned by the object. Also included, is an image processor that computes distance information from the time difference between signal transmission and reception of the ranging signal. The image processor combines the distance information and 2-D digital image information to produce 3-D digital image information representing the object.

Clearly, some alternative embodiments may exhibit advantages and features in addition to, or in lieu of, those mentioned above. Additionally, other interface systems and methods may become apparent based upon the present disclosure. It is intended that all such additional systems, methods, features, and/or advantages be included within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The various embodiments generally describe systems and methods related to 3-dimensional (3-D) imaging. In one exemplary embodiment, the 3-D imaging system incorporates a 2-dimensional (2-D) image capture system together with a distance measurement system that provides positional information of an object to be imaged. The positional information is combined with 2-D digital image information representing the object obtained from the 2-D image capture system to produce 3-D digital image information representing the object.

Figure 1:
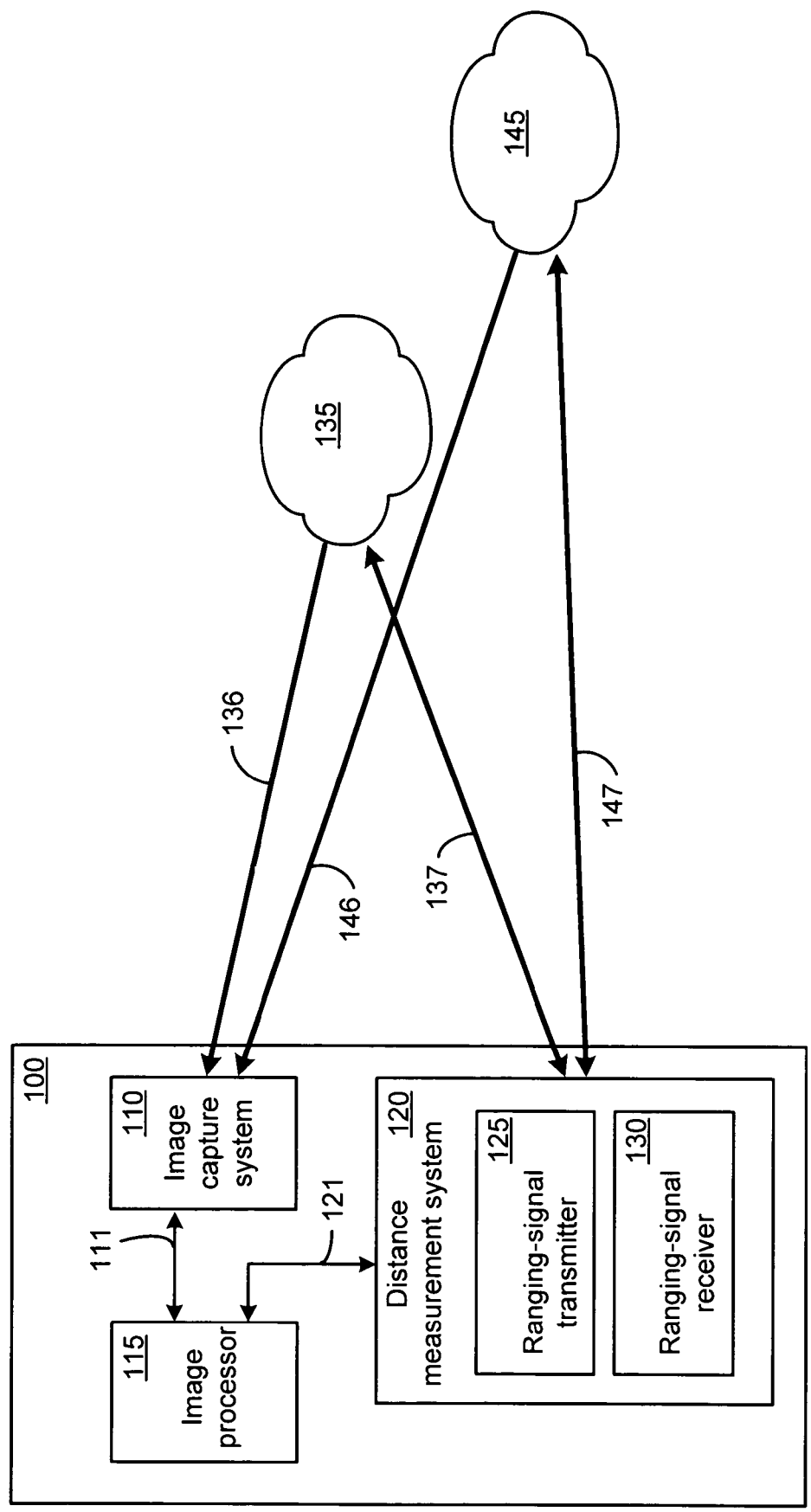
FIG. 1 shows an exemplary embodiment of a 3-D imaging system in accordance with the present invention.

FIG. 1 shows an exemplary embodiment of a 3-D imaging system 100 in accordance with the present invention. 3-D imaging system 100 includes a 2-D image capture system 110 having a lens system to focus light received from one or more objects, such as first object 135, on to an optoelectronic sensor. The optoelectronic sensor, for example, a complementary metal oxide semiconductor (CMOS) sensor array, generates 2-D electrical signals representing image pixels. The 2-D electrical signals are provided to a processing device, such as an application specific integrated circuit (ASIC). The ASIC processes these signals using various techniques such as interpolation, correlation, and image enhancement, to generate 2-D digital image information representing first object 135. The 2-D digital image information is provided to image processor 115 via communication link 111.

In one exemplary application of the embodiment described above, both the first object 135 and the 3-D imaging system 100 are stationary and the 2-D digital image information corresponds to one captured image frame. In another exemplary application of the embodiment described above, first object 135 moves and 3-D imaging system 100 is stationary. Here, the 2-D digital image information represents a sequence of image frames captured and processed at a suitable frame repetition rate.

In yet another exemplary application of the embodiment described above, first object 135 is stationary while 3-D imaging system 100 is in motion. Here again, the 2-D digital image information is generated as a sequence of image frames captured and processed at a suitable frame repetition rate. With reference to this exemplary application, attention is directed to a published article titled "Silicon Optical Navigation" by Gary Gordon et al., dated Apr. 17, 2003, which describes a flying-mouse controller. The flying-mouse controller constitutes one implementation of a 2-D image capture system such as image capture system 110 contained in 3-D imaging system 100.

FIG. 1 shows two objects that are located in front of 3-D imaging system 100. The first object 135 is located closer to 3-D imaging system 100 than second object 145. 2-D image capture system 110 captures light traveling along optical paths 136 and 146 for deriving the 2-D digital image information representing the two objects. In one embodiment, 2-D image capture system 110 incorporates an image scanner that is operated to scan an area in front of 3-D imaging system 100 using a sequential scanning pattern to generate 2-D image information of one or more objects located in front of 3-D imaging system 100. In a further embodiment, 2-D image capture system 110 incorporating the image scanner is housed in a hand-held enclosure, such as a hand-held mouse, which is used to carry out a manual scan by an operator of 2-D image capture system 110.

Distance measurement system 120 contains a ranging-signal transmitter 125 that generates and transmits a signal suitable for free-space transmission. In certain embodiments, ranging-signal transmitter 125 generates a radio-frequency (RF) signal for wireless transmission by 3-D imaging system 100. In a first of such embodiments, the RF signal is selected to have a fixed, single frequency, while in a second of such embodiments the RF signal has a spread-spectrum characteristic.

In other embodiments ranging-signal transmitter 125 generates an optical signal for transmission by 3-D imaging system 100. In a first of such embodiments, the optical signal has a wavelength invisible to the human eye, while in a second of such embodiments the optical signal contains a wavelength visible to the human eye.

In yet another embodiment, ranging-signal transmitter 125 contains an ultrasonic transducer to generate an ultrasonic signal that is launched from 3-D imaging system 100 at some moment in time. Upon encountering an object, the ultrasonic signal is deflected in several directions including back towards 3-D imaging system 100. Further details of the ultrasonic transducer and radiation patterns of the ultrasonic signal are provided below using other figures.

Ranging signal path 137 represents transmission of the ultrasonic signal towards first object 135 and the resulting return towards 3-D imaging system 100. Similarly, ranging signal path 147 represents transmission of the ultrasonic signal towards second object 145 and the resulting return towards 3-D imaging system 100.

Ranging-signal receiver 130 receives a first ultrasonic return signal along path 137, authenticates the signal, and detects the timing instant at which the return signal was received at 3-D imaging system 100. This return timing instant is referenced to the signal launch instant to determine a round-trip delay. The second return signal is then used to calculate distance information representing the distance of first object 135 from 3-D imaging system 100. Because second object 145 is located further away, ranging-signal receiver 130 receives a second return signal at a later instant. The second return signal is used to determine the corresponding round-trip delay from which is calculated distance information representing the distance of second object 145 from 3-D imaging system 100. The round-trip delays of the two objects can be further used to calculate distance information representing the distance between the two objects.

A simplistic equation for distance calculation is:

$$D=(t_d \times c)/2$$

where $t_d$ is the round-trip delay between launching and receiving the ranging signal, D is the distance of an object from where the ranging signal is launched, and c is the velocity of light in a vacuum (299792.458 km/sec).

With reference to FIG. 1, in a first embodiment, the various timing instants such as launch timing instant and received timing instant, are provided as analog signals via communication link 121 to image processor 115. Image processor 115 then calculates the distance information. In a second embodiment, the distance information is calculated inside distance measurement system 120 and provided to image processor 115 via communication link 121 in digital data format.

Several types of ultrasonic distance measurement systems are commercially available. For example, the Polaroid 6500 series sonar ranging module can be used to measure distances ranging from 405 mm to 10.7 m with an absolute accuracy of typically a few percent of the reading over the full range.

Image processor 115 receives distance information from distance measurement system 120 via communication link 121, and 2-D digital image information from 2-D image capture system 110 via communication link 111. Image processor 115 then processes the received information to generate 3-D digital image information representing an image of the two objects. This 3-D digital image information is then used in a variety of applications, some of which are described below.

Communication link 111 as well as other communication links of 3-D imaging system 100 are unidirectional links in some embodiments and bidirectional links in other embodiments. For example, in one embodiment, communication link 111 is a bi-directional communication link and is used to communicate image information from image capture system 110 to image processor 115 in one direction, and communicate control signals from image processor 115 to image capture system 110 in the opposite direction.

In this exemplary embodiment, image capture system 110 incorporates an auto-focusing system (not shown) that automatically focuses upon an object of specific interest to 3-D imaging system 100. The object of specific interest is determined by image processor 115. This determination is carried out using criteria programmed into image processor 115. Some examples of such criteria include object size, object distance, stationary object, moving object, and object type. Image processor 115 uses one or more of these criteria to generate a control signal that is provided to image capture system via communication link 111.

In one embodiment, if object 135 is of more interest than object 145, image processor 115 receives distance information from distance measurement system 120 and uses this information to generate the control signal for configuring image capture system 110 to focus on object 135 rather than on object 145. Such an auto-focus provides 3-D imaging information representing object 135 in sharper focus than object 145.

Figure 2:
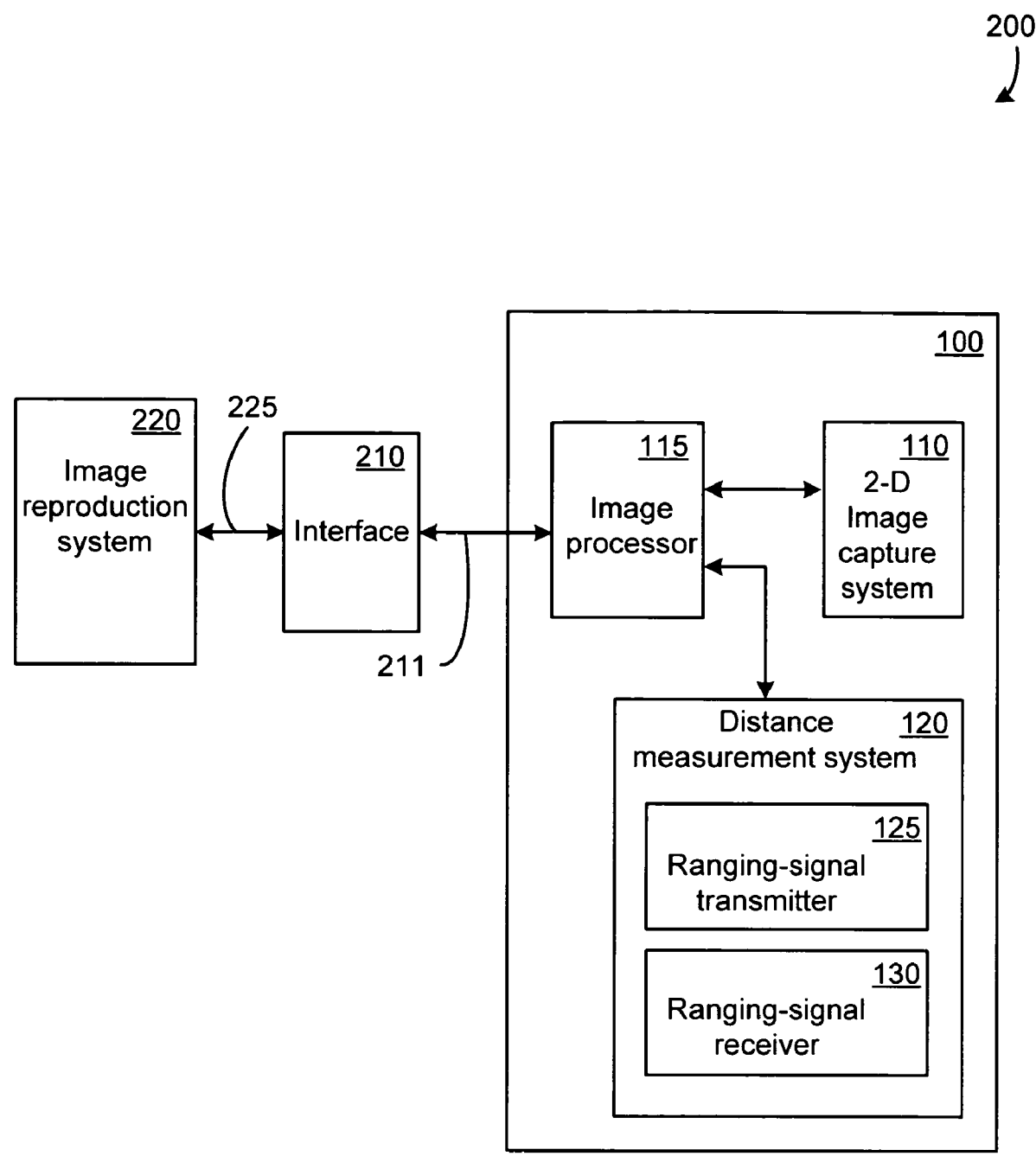
FIG. 2 shows an exemplary embodiment of a 3-D image reproduction system incorporating the 3-D imaging system of FIG. 1.

FIG. 2 shows an exemplary embodiment of a 3-D image reproduction system 200 incorporating 3-D imaging system 100 of FIG. 1. The 3-D digital image information generated by image processor 115 is provided via communication link 211 to interface 210. In the exemplary embodiment of FIG. 2, interface 210 is shown external to 3-D imaging system 100. In other embodiments, interface 210 is housed along with 3-D imaging system 100 inside a common enclosure.

Interface 210 provides formatting and other transmission-related functions to transmit the 3-D digital image information via communication link 225 to an image reproduction system 220. Communication link 225 may be implemented using various technologies, such as wire-line, wireless, and optical technologies. For example, in a first embodiment, communication link 225 is a Universal Serial Bus (USB) cable carrying digital data in USB format. In a second embodiment, communication link 225 is an infra-red link carrying digital data in a wireless format. In a third embodiment, communication link 225 is an optical cable carrying digital data in a Fiber Distributed Data Interface (FDDI) format.

Image reproduction system 220 of FIG. 2 is, in one embodiment, a computing device such as a personal computer (PC) configured to receive via communication link 225, the 3-D digital image information. The 3-D digital image information may be optionally processed for image enhancement and correction if desired, and used to generate a 3-D digital image. The 3-D digital image can be then routed to a monitor screen for viewing, routed to a photo-printer for printing, or routed to a controller for carrying out control functions such as those in a robot.

Figure 3:
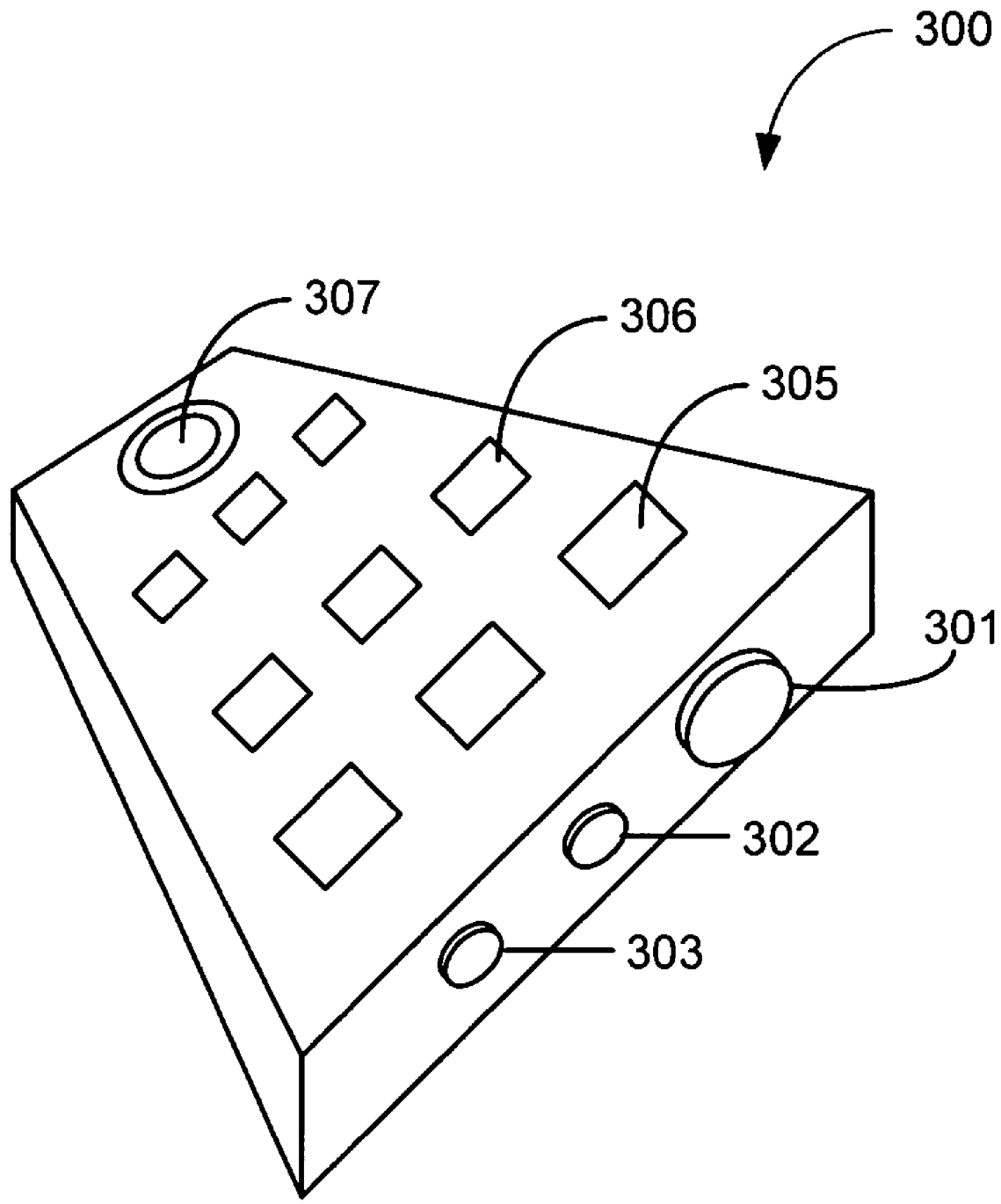
FIG. 3 shows a first exemplary hand-held imager housing the 3-D imaging system of FIG. 1.

FIG. 3 shows a first exemplary hand-held imager 300 housing a 3-D imaging system such as 3-D imaging system 100 of FIG. 1. Lens 301 is a part of the optics associated with a 2-D image capture system such as 2-D image capture system 110 of FIG. 1. Transmit port 302 is used to transmit the ranging signal such as the ultrasonic signal described above, while receive port 303 is used to receive the return signals from one or more objects.

Also shown are operator keys 305 and 306 which are activated by an operator to carry out various key-related operations. Control element 307, for example, a joystick, a scroll-ball, or a set of multi-directional navigational keys, is also used by the operator for carrying out various operations such as menu-driven navigation and 3-D scanning.

In a first embodiment, hand-held imager 300 is a 3-D scanner which is used to generate 3-D image information representing an object, for example, in a computer aided design (CAD) application.

In a second embodiment, hand-held imager 300 is a 3-D remote control used to operate one or more devices, for example, one or more television sets. This embodiment will be described further with additional reference to FIG. 1. Here, object 135 is a first TV set located at a certain spot in a room, while object 145 is a second, similar TV set located further back in the same general direction. A conventional TV remote control would be unable to control the two TV sets individually because the two sets are similar. Consequently, both TV sets would respond identically each time the conventional TV remote control is operated.

On the other hand, the 3-D remote control can determine positional information representing the position of the two TV sets. The positional information is used to generate appropriately-directed narrow-beam control signals for individually controlling the two TV sets. Positional information includes distance information as well as angular deviation of the two TV sets with reference to a reference axis of the 3-D remote control. The angular deviation aspect will be described below in more detail using FIGS. 6A, 6B, 7A, and 7B.

Figure 4:
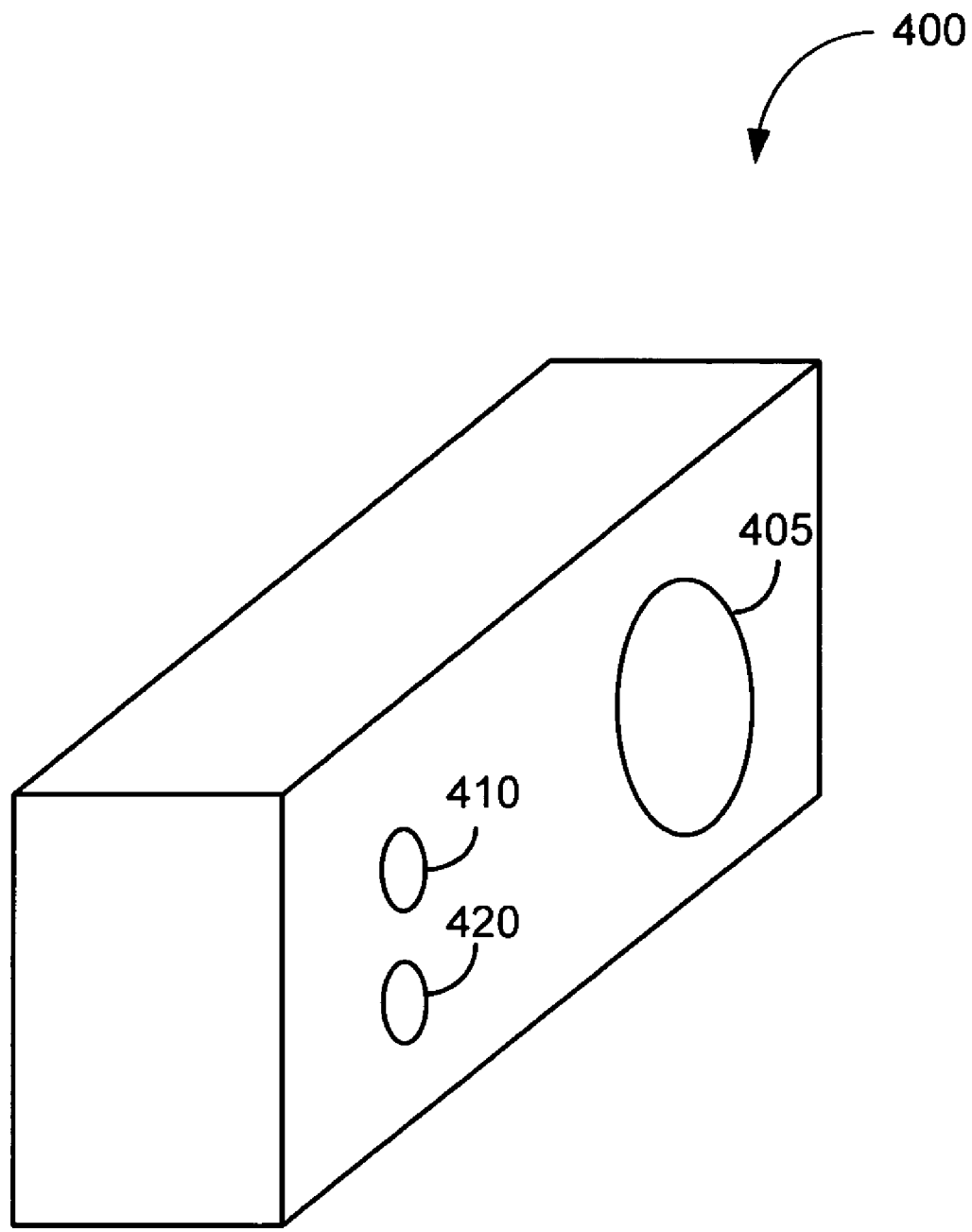
FIG. 4 shows a second exemplary hand-held imager housing the 3-D imaging system of FIG. 1.

FIG. 4 shows a second exemplary hand-held imager 400 housing 3-D imaging system 100 of FIG. 1. In one exemplary embodiment, hand-held imager 400 is a 3-D digital camera. In this 3-D digital camera, lens 405 is a part of the optics associated with a 2-D image capture system such as image capture system 110 of FIG. 1. Lens 405 is a low-cost lens that is selected to have a fixed focus that is not necessarily optimal for capturing sharp images of objects at various distances. Consequently, the 2-D image capture system contained in the camera captures a slightly blurred image. Such a blurred image provides certain advantages for image processing purposes because the spatial frequencies contained in the blurred image are longer in wavelength than the size of the individual elements of the optoelectronic sensor array contained inside the camera.

Transmit port 410 is used to transmit an ultrasonic ranging signal that is reflected by one or more objects. The return ranging signal is received via receive port 420 and used for obtaining distance information representing the distances of the objects from hand-held imager 400. The distance information is combined with the 2-D image to generate 3-D digital image information, which can then be used to generate a 3-D image as described above with reference to FIG. 2. The generated 3-D image has a sharper focus on one or more objects of specific interest.

Figure 5A:
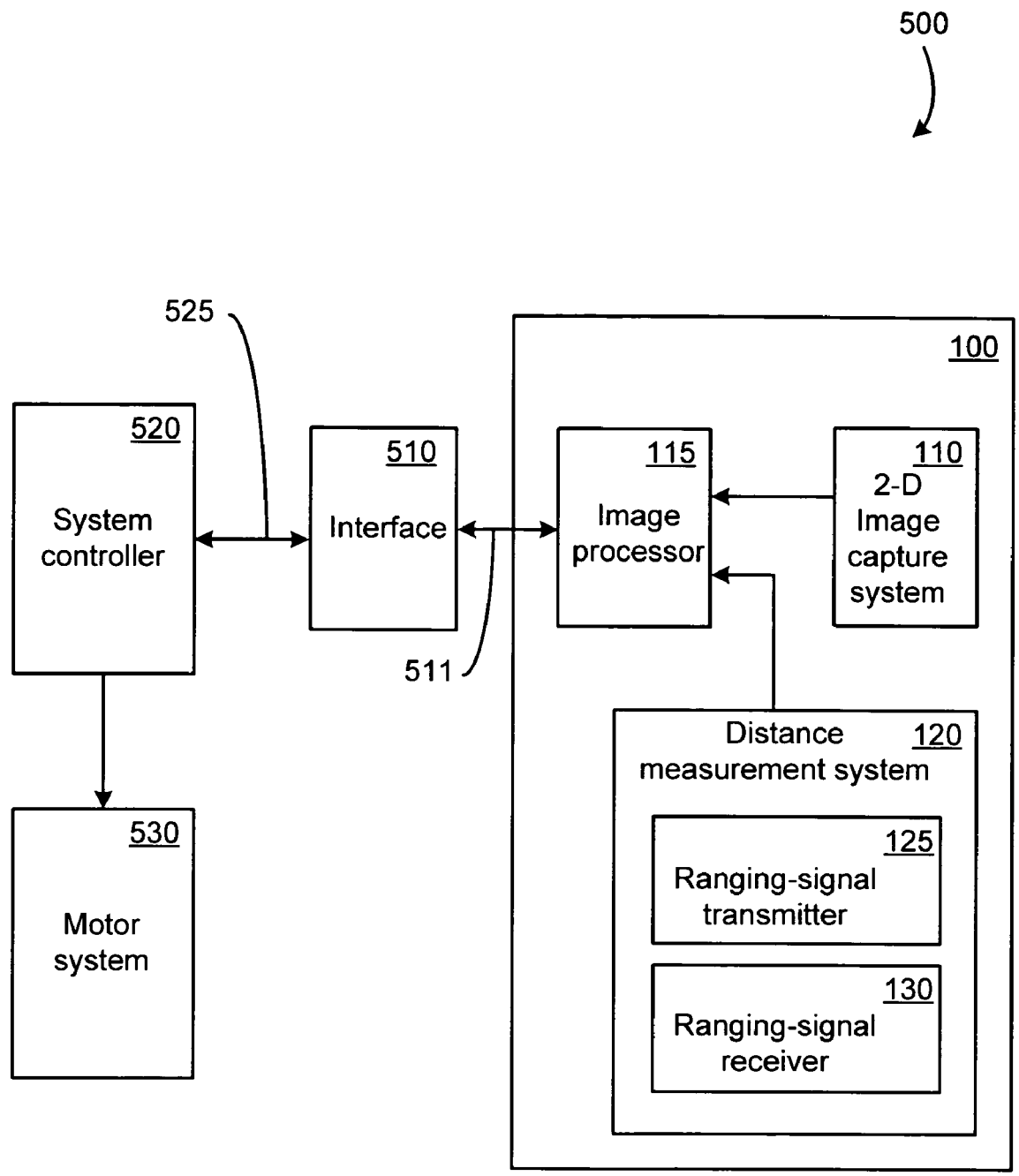
FIG. 5A shows an exemplary embodiment of a system controller incorporating the 3-D digital imaging system of FIG. 1.

FIG. 5A shows an exemplary embodiment of a system controller 500 incorporating the 3-D digital imaging system 100 of FIG. 1. The 3-D digital image information generated by image processor 115 is provided via communication link 511 to interface 510. In the exemplary embodiment of FIG. 5A, interface 510 is shown external to 3-D imaging system 100. In other embodiments, interface 510 is housed along with 3-D imaging system 100 inside a common enclosure. Interface 510 provides formatting and other transmission-related functions to transmit the 3-D digital image information via communication link 525 to an image reproduction system 520. Communication link 525 may be implemented using various technologies, such as wire-line, wireless, and optical technologies.

In this exemplary embodiment, system controller 520 is a motor controller that uses the 3-D digital image information to derive control signals for operating motor system 530. In other embodiments, system controller 520 is used in a variety of applications, such as for operating servomechanisms contained in an industrial robot or in a mobile system for navigating around obstacles. Servomechanisms include electrical as well as mechanical devices utilizing a number of technologies including electronic, hydraulic, and pneumatic technologies.

Figure 5B:
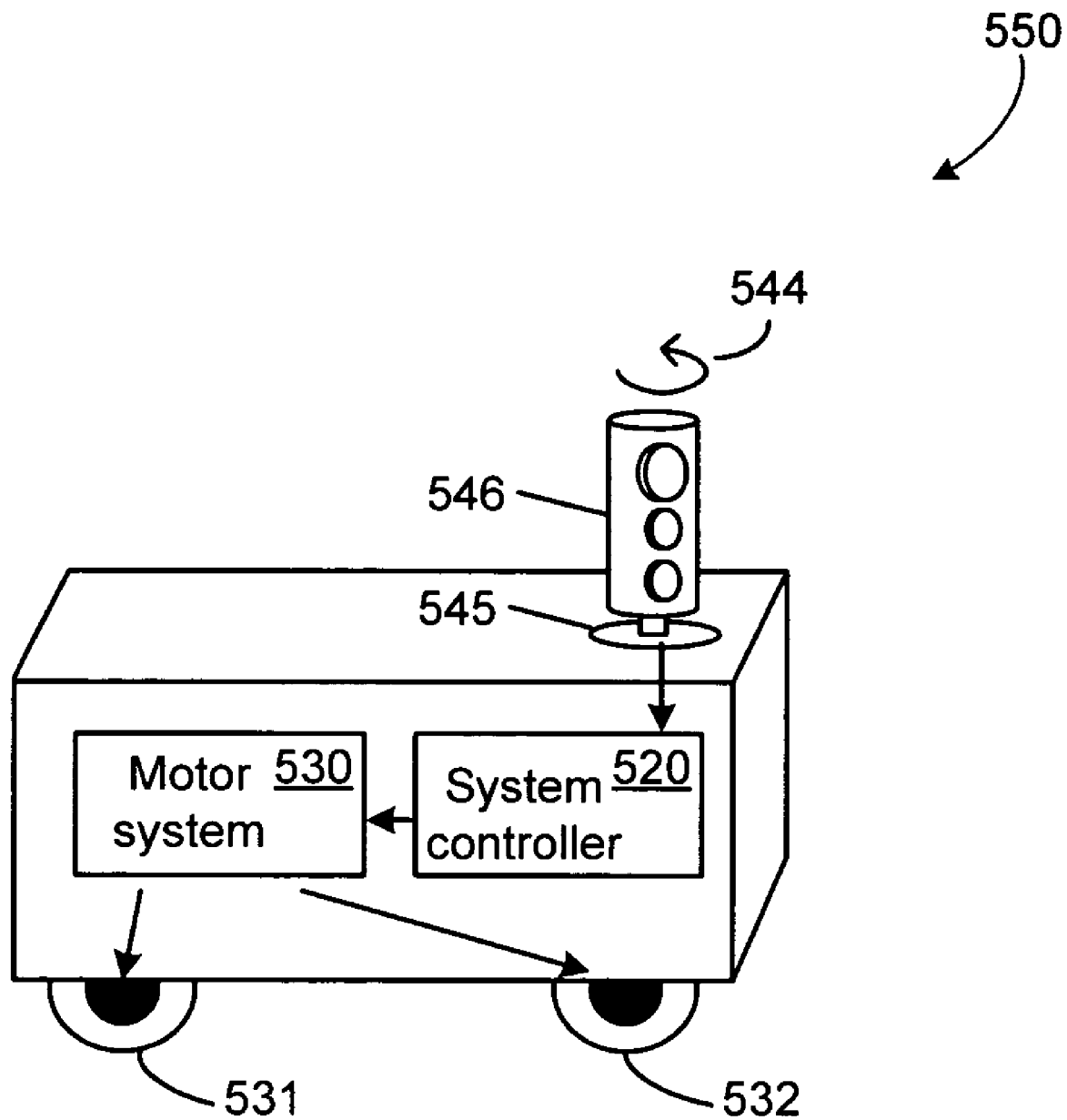
FIG. 5B shows an exemplary mobile system incorporating the system controller of FIG. 5A.

FIG. 5B shows an exemplary mobile system 550 incorporating system controller 500 of FIG. 5A. In this exemplary embodiment, motor system 530 incorporates individual motors and servomechanisms that are linked to each of the wheels, such as wheels 531 and 532, of mobile system 550. 3-D imaging system 100 is housed in an enclosure 546 that is mounted on a rotatable platform 545 that is rotatable through 360 degrees in a horizontal plane as indicated by arrow 544. In another embodiment, 3-D imaging system 100 is housed in an enclosure that is mounted upon a fixture that can be adjusted to orient 3-D imaging system 100 in one of several directions both horizontal and vertical.

For example, in this embodiment, 3-D imaging system 100 can be positioned to point upwards to assist mobile system 550 in avoiding hanging objects, or downwards towards the ground to assist mobile system 550 in recognizing the terrain over which it is traveling.

Mobile system 550 further includes interface 510 of FIG. 5A housed inside enclosure 546. 3-D digital image information is communicated to system controller 520. System controller 520 provides control signals to operate motor system 530. In this embodiment, mobile system 550 uses the 3-D digital image information to navigate around obstacles present in its travel path. Motor system 530 provides wheel rotation as well as wheel alignment to the wheels, thereby suitably setting both speed and direction of travel of mobile system 550. The 3-D digital image information is obtained by using a 2-D image capture system together with distance information generated by a distance measuring system as described above with reference to FIGS. 1 and 2. When autofocus is included in the 3-D imaging system, mobile system 550 incorporates the capability to navigate around certain specific objects, such as a first object located closer to mobile system 550 than a second object located further away. Consequently, mobile system 550 can navigate around objects in its immediate vicinity with more accuracy.

Figure 6A:
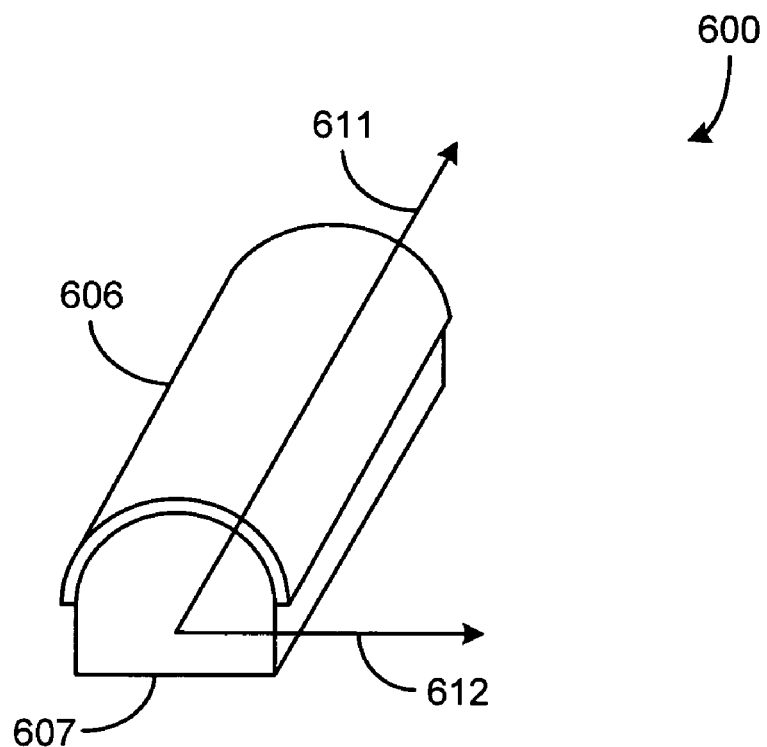
FIG. 6A shows an exemplary embodiment of a single-element piezofilm ultrasonic transducer incorporated into a distance measurement system that is shown in FIG. 1.

FIG. 6A shows an exemplary embodiment of a single-element piezofilm ultrasonic transducer 600 incorporated into distance measurement system 120 of FIG. 1. Ultrasonic transducer 600, which is incorporated into ranging-signal transmitter 125 of distance measurement system 120, is formed of a piezoelectric sheet 606 molded on to a rigid base 607. Base 607 has a semi-cylindrical shape that allows piezoelectric sheet 606 to produce a wide-angle radiation pattern when an electrical signal is applied to ultrasonic transducer 600 for transmitting a ranging signal. This wide-angle radiation pattern is explained below in more detail. A longitudinal axis of ultrasonic transducer 600 is defined by longitudinal axis 611. A cross-sectional axis of ultrasonic transducer 600 is defined by cross-sectional axis 612.

Ultrasonic transducer 600 can be operated as a transceiver in certain embodiments. Therefore, in one embodiment, ultrasonic transducer 600 is shared between ranging-signal transmitter 125 and ranging-signal receiver 130 of FIG. 1. In this embodiment, ultrasonic transducer 600 is configured to operate as a transmitter during a first period of time and as a receiver during a second period of time.

Figure 6B:
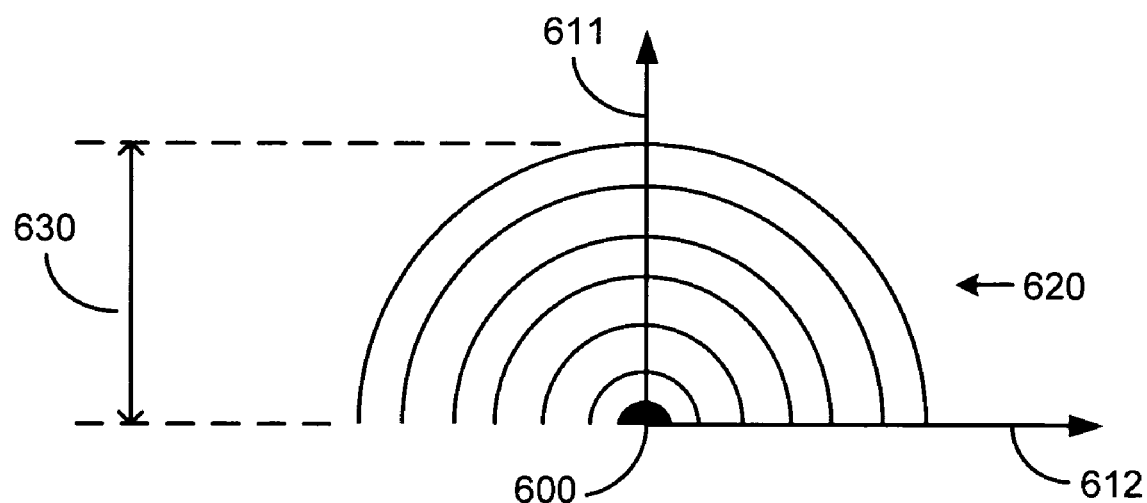
FIG. 6B shows a wide-angle radiation pattern generated by the single-element ultrasonic transducer of FIG. 6A.

FIG. 6B shows a wide-angle radiation pattern 620 generated by ultrasonic transducer 600 of FIG. 6A. Wide-angle radiation pattern 620 has identical reach along longitudinal axis 611 as well as along cross-sectional axis 612. The wide-angle radiation pattern 620 is used to obtain positional information of one or more objects over a 180 degree field of operation. Such a wide-angle radiation pattern 620 provides wide coverage at the expense of radiation reach. Typically, radiation reach 630 of FIG. 6B is less than a reach obtained in a directional radiation pattern.

Figure 7A:
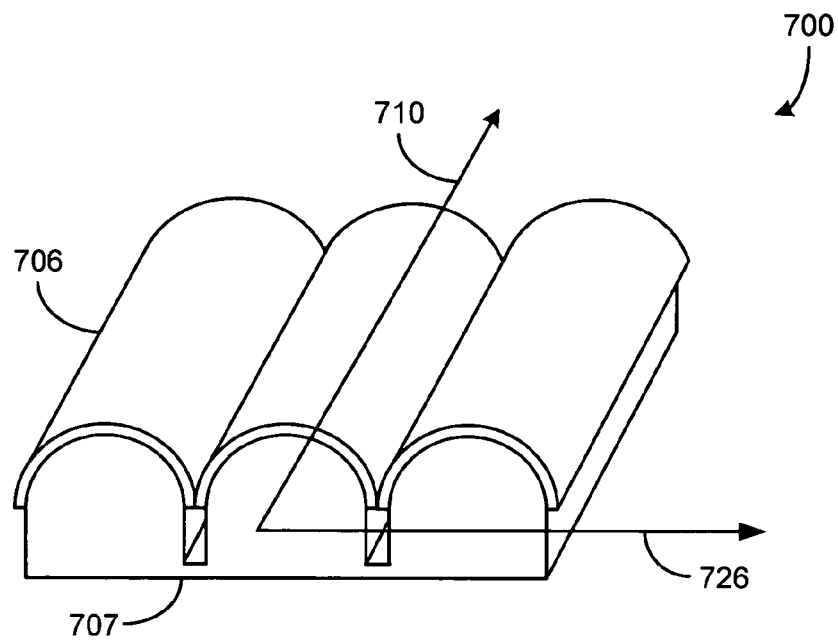
FIG. 7A shows an exemplary embodiment of a multi-element piezofilm ultrasonic transducer incorporated into the distance measurement system of FIG. 1.

FIG. 7A shows an exemplary embodiment of a multi-element piezofilm ultrasonic transducer 700 incorporated into distance measurement system 120 of FIG. 1. Ultrasonic transducer 700, which is incorporated into ranging-signal transmitter of distance measurement system 120, is formed of a piezoelectric sheet 706 molded on to a rigid base 707. Base 707 is formed of foam material shaped as multiple semi-cylinders located adjacent to one another along a horizontal plane. Ultrasonic transducer 700 allows ultrasonic transducer 700 to produce a directional radiation pattern when an electrical signal is applied to ultrasonic transducer 700 for transmitting a ranging signal. This directional radiation pattern is explained below in more detail. Ultrasonic transducer 700 can be operated both as a ranging signal transmitter as well as a ranging signal receiver.

Figure 7B:
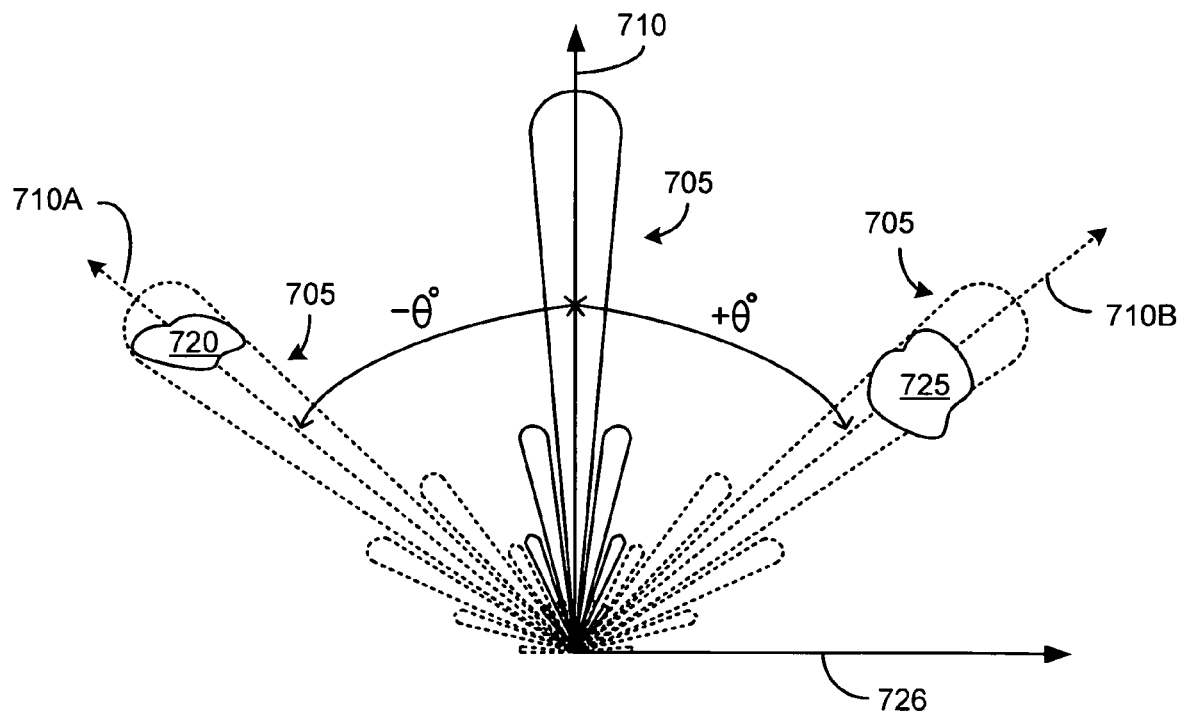
FIG. 7B shows a directional radiation pattern generated by the multi-element ultrasonic transducer of FIG. 7A.

FIG. 7B shows a directional radiation pattern generated by ultrasonic transducer 700 of FIG. 7A. Main lobe 705 is transmitted along a longitudinal axis of ultrasonic transducer 700. Main lobe 705 provides greater radiation reach in comparison to radiation reach 630 referenced in FIG. 6B. In addition to better radiation reach, wider radiation coverage may be carried out by transmitting main lobe 705 at a first instant along a reference axis 710 and at other instants along other axes, such as axis 710A, axis 710B, and cross-sectional axis 726. Transmission along axes other than reference axis 710 is carried out by suitably orienting ultrasonic transducer 700.

For example, transmission along axis 710A is carried out by orienting ultrasonic transducer 700 such that the longitudinal axis of ultrasonic transducer 700 lies along axis 710A. Similarly, transmission along axis 710B is carried out by orienting ultrasonic transducer 700 such that the longitudinal axis of ultrasonic transducer 700 lies along axis 710B.

In a first embodiment of such a transmission, ultrasonic transducer 700 is rotated through 180 degrees. Consequently, main lobe 705 is directed in different directions over 180 degrees at different instants of time, thereby resulting in good radiation coverage. In a second embodiment, ultrasonic transducer 700 is rotated through 360 degrees. Consequently, main lobe 705 is rotated through a scan pattern covering 360 degrees thereby resulting in even wider radiation coverage.

Ultrasonic transducer 700 is used to obtain positional information of one or more objects that are located within reach of main lobe 705. Such positional information not only includes distance information but also azimuth information. In one embodiment, azimuth information is generated by using the direction of transmission of main lobe 705.

For example, when a first object 720 is detected during transmission of main lobe 705 along axis 710A, distance information of first object 720 is generated as described above with reference to FIGS. 1 and 2. Additionally, the position of ultrasonic transducer 700 is used to derive azimuth information of first object 720. In this example, the azimuth information indicates that first object 720 is located at a deviation angle of $(+\theta°)$ from reference axis 710. Positional information of a second object 725 located along axes 710B is obtained when main lobe 705 is transmitted along axes 710B. In addition to deriving distance information of second object 725, azimuth information is again derived by using the position of ultrasonic transducer 700. In this instant, the azimuth information indicates that second object 725 is located at a deviation angle of (−θ°) from reference axis 710.

Azimuth difference between first object 720 and second object 725 is obtained by combining azimuth information of the two objects. In the example described above, the azimuth difference between first object 725 and second object 725 is an angular difference of (2×θ°).

Figure 8:
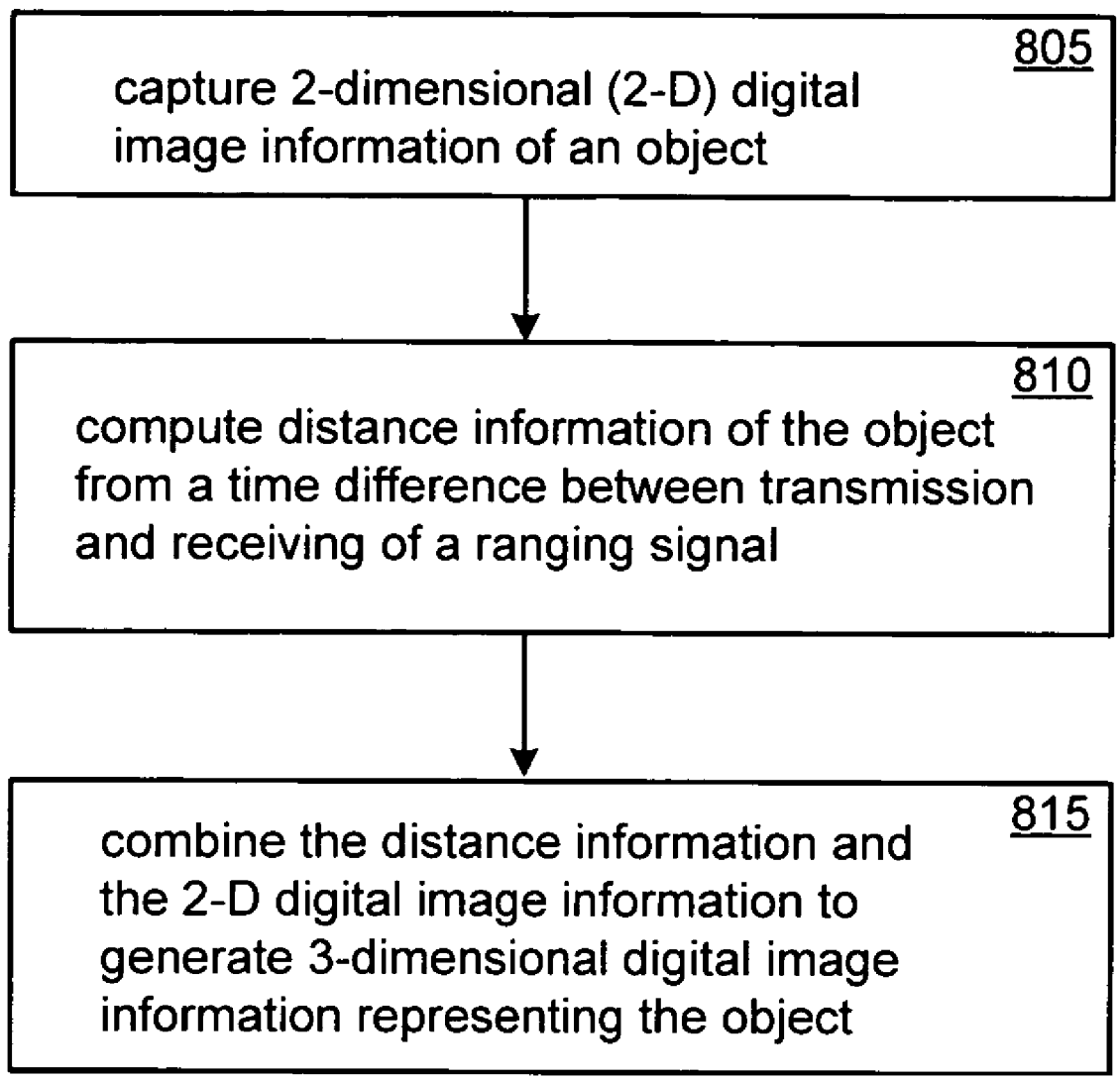
FIG. 8 shows a flowchart of one exemplary imaging method.

FIG. 8 shows a flowchart of one exemplary imaging method. In block 805, 2-D digital image information of an object is captured. This is carried out using an image capture system, such as image capture system 110 of 3-D imaging system 100 described above using FIGS. 1 and 2.

In block 810, distance information of the object is computed. This computation is carried out by transmitting a ranging signal towards the object. In one exemplary embodiment, the ranging signal is an ultrasonic signal. The ranging signal is returned by the object after a certain time delay. This time delay corresponds to propagation time of the ranging signal to and from the object. The time delay is used to calculate the distance of the object. A greater time delay is indicative of a greater distance separating the 3-D imaging system and the object.

In block 815, the distance information is combined with the 2-D digital image information to generate 3-D digital image information representing the object. In one exemplary embodiment, the 3-D digital image information is used to generate a 3-D digital image in a computer.

The above-described embodiments are merely set forth for a clear understanding of the principles of the disclosure. Many variations and modifications may be made without departing substantially from the disclosure. All such modifications and variations are included herein within the scope of this disclosure.

We claim:

1. An imaging system, comprising:
   an image capture system configured to generate 2-dimensional (2-D) digital image information representing a first object;
   a ranging signal transmitter configured to transmit a ranging signal towards the first object;
   a ranging signal receiver configured to receive the ranging signal returned by the first object;
   an image processor configured to compute distance information from a time difference between transmission and reception of the ranging signal; the image processor further configured to combine the distance information and the 2-D digital image information to produce 3-dimensional (3-D) digital information representing the first object; and
   a control signal transmitter configured to transmit a control signal for controlling the first object, the control signal derived using the 3-D digital information representing the first object.

2. The imaging system of claim 1, wherein the 3-D digital information further comprises azimuth information of the first object.

3. The imaging system of claim 1, wherein the image capture system comprises an image scanner.

4. The imaging system of claim 3, wherein the scanner, the signal transmitters, the signal receiver, and the image processor are located inside a hand-held housing.

5. The imaging system of claim 1, further comprising:
   an image reproduction system configured to generate from the 3-D digital information of the first object, a 3-D digital image of the first object.

6. The imaging system of claim 1, further comprising:
   a system controller that is part of a mobile system, the system controller configured to generate from the 3-D digital information of the first object, a control signal to control an element of the mobile system.

7. The imaging system of claim 6, wherein the mobile system comprises one of a) a robot, b) a vacuum cleaner, and c) a lawnmower.

8. The imaging system of claim 1, wherein the ranging signal comprises one of a) an ultrasonic signal and b) a radio-frequency (RF) signal.

9. The imaging system of claim 1, wherein the image capture system is an auto-focus system.

10. The imaging system of claim 9, wherein the auto focus system is configured to receive a control signal from the image processor for specifying the first object as a focal object.

11. An imaging system, comprising:
    an image capture system configured to capture 2-dimensional (2-D) digital image information representing a first object and a second object;
    a signal transmitter configured to transmit a ranging signal towards the first object at a first instant in time, and towards the second object at a second instant in time, the ranging signal having a radiation pattern that is selected to preclude concurrent incidence of the ranging signal upon the first and second objects;
    a signal receiver configured to receive the ranging signal after reflection by one of the first object or the second object; and
    an image processor configured to compute distance information of the first object from a time difference between transmission of the ranging signal towards the first object and reception of the ranging signal after reflection by the first object, and distance information of the second object from a time difference between transmission of the ranging signal towards the second object and reception of the ranging signal after reflection by the second object; the image processor further configured to combine the distance information of the first object and the second object with the 2-D digital image information to produce a 3-dimensional (3-D) digital image information representing the first object and the second object.

12. An imaging method, comprising:
    using an image capture device for capturing a blurred 2-dimensional (2-D) digital image of a first object;
    computing distance information of the first object from a time difference between transmission and receiving of a ranging signal; and
    combining the distance information of the first object and spatial frequencies contained in the blurred 2-D digital image of the first object to generate 3-dimensional (3-D) digital information of the first object.

13. The method of claim 12, further comprising:
    capturing 2-dimensional (2-D) digital image information of a second object;
    computing distance information of the second object from a time difference between transmission and receiving of the ranging signal; and
    combining the distance information of the first object, the 2-D digital image information of the first object, the distance information of the second object, the 2-D digital image information of the second object to generate 3-dimensional (3-D) digital image information of the first object and the second object.

14. The method of claim 13, further comprising:
determining azimuth information of the first object and azimuth information of the second object.

15. The method of claim 13, further comprising:
determining azimuth difference between the first object and the second object.

16. The imaging system of claim 1, wherein the control signal is a radio-frequency signal having a radiation pattern that is configured for selectively controlling the first object while not affecting other objects located in the vicinity of the first object.

17. The imaging system of claim 1, wherein the image capture system is configured to capture a blurred image of the first object and derive therefrom, the 2-dimensional digital image information representing the first object.

18. The imaging system of claim 11, wherein the signal transmitter is an ultrasonic signal transmitter that transmits an ultrasonic signal having a radiation pattern comprising a main lobe and at least two side lobes.

19. The imaging system of claim 18, wherein the main lobe has a narrow coverage that precludes concurrent incidence of the main lobe upon the first and second objects, and wherein the ultrasonic signal transmitter is operable to direct the main lobe along desired axes of transmission.

20. The method of claim 12, wherein the image capture device comprises an optoelectronic sensor array, and wherein the blurred image is selected to contain spatial frequencies having wavelengths that are longer in size than individual sensing elements contained in the optoelectronic sensor array.

* * * * *